United States Patent [19]

Groshens

[11] Patent Number: 4,874,655
[45] Date of Patent: Oct. 17, 1989

[54] FUSIBLE TEXTILE PRODUCT AND METHOD OF MANUFACTURE

[75] Inventor: Pierre Groshens, Peronne, France

[73] Assignee: Lainiere de Picardie, France

[21] Appl. No.: 120,843

[22] Filed: Nov. 13, 1987

[30] Foreign Application Priority Data

Nov. 14, 1986 [FR] France .................................. 86 15878

[51] Int. Cl.$^4$ .............................................. B32B 27/14
[52] U.S. Cl. .................................. 428/198; 427/20.71; 427/208; 427/208.2; 427/208.4; 427/208.6; 427/208.8; 427/258; 427/337; 427/342; 427/412; 428/200; 428/288; 428/420
[58] Field of Search ................ 428/198, 200, 288, 420; 427/207.1, 208, 208.2, 208.4, 208.6, 208.8, 258, 337, 342, 412

[56] References Cited

U.S. PATENT DOCUMENTS 4,647,492  3/1987  Grant et al. ......................... 428/198

*Primary Examiner*—Marion C. McCamish
*Attorney, Agent, or Firm*—Mason, Fenwick & Lawrence

[57] ABSTRACT

The invention relates to a fusible textile product and its method of manufacture. This thermally fusible product, intended particularly for the textile industry of a type comprising on one hand, a woven, knitted or nonwoven textile substrate and, on the other hand, points of a thermally fusible material distributed on one of the external faces of the substrate, in particular polymer base. It comprises at least one reactive material and at least one reactive mean suitable for stimulating fixing and developing the reaction between the reactive material and a part of the thermally-fusible material with a view to partially modifying its chemical structure at least at the interface with the substrate, in such a way as to prevent the thermally-fusible material flowing through the substrate when affected by heat, pressure or steam. Method of manufacture of such a product.

24 Claims, No Drawings

FUSIBLE TEXTILE PRODUCT AND METHOD OF MANUFACTURE

The invention relates to a fusible textile product and its method of manufacture.

Polymerization reactions have long been used in the textile industry for fusing laps: U.S. document no. 2 438 176 published in 1948 describes using the reaction of polyvinyl alcohols with aldehyde in order to fuse several textile substrates to produce a fabric impermeable to gases.

GB document no. 549 451 describes the fusing of laps of fabric impregnated with a mixture of polyvinyl alcohol and aldehyde by means of heating.

In 1965 FR document no. 1 415 073 described the fusing of two fibre laps composed of at least two components which harden at ambient temperature and contain epoxy or polyamide-based resins.

GB document no. 761 364 proposes a method of fusing of two textile laps, according to which the laps are impregnated with non-saturated polyester resin and a polymerization catalyst, then sprayed with a polymerizable vinyl monomer-based solution.

Also known is the use of thermally fusible products in the textile industry for linings and interlinings. These thermally fusible products comprise, on the one hand, a continuous, woven, knitted or non-woven textile substrate, and, on the other hand points of thermally fusible material distributed on one of the external surfaces of the substrate. The fusible material consists of polymers (more particularly copolyamides, copolyesters, polyethylenes, copolymers of polyethylene or even chlorinated polyvinyls or polyurethanes) which melt at relatively low temperatures under slight pressure. More specifically these polymers have molecular masses and viscosities in the melted state which are sufficient for rapid and simple melting under the combined effect of heat and pressure.

Such thermally fusible products are used in the clothing industry with steam or heat presses. The pressure used is of the order of a few decibars to a few bars, the temperature being between 120 C. and 180 C. and the time required being relatively short, from 10 to 30 seconds.

Such thermally fusible products generally give rise to the problem of penetration of the textile substrate by the fusible matter when used in the clothing industry, due to flow of the polymers constituting the fusible material when it is simultaneously subjected to heating and pressure, and possibly steaming.

To date various solutions have been envisaged in order to rectify this problem. An initial known solution (specifications DE 2 214 236 and 2 231 7231) consists in superimposing two or more layers of polymers having different physical properties (specifically viscosity and fusion temperature). A second solution (FR No. 85 13 143) consists of a special process of linking the thermally fusible material with the textile substrate in order to prevent excessive penetration of the thermally fusible material into the textile substrate. In document FR No. 2 241 604 it is proposed that a separation layer is introduced between the fusible adhesive and the textile support. According to this technique the layer is distinguished from the thermoadhesive layer not only by degrees but also in principle.

These three solutions do, however, have disadvantages or limitations. As far as the first and third are concerned they require several distinct polymers and their linking to the substrate. As regards the second solution, it implies a specific process for producing the thermally fusible product.

The aim of the invention is to eliminate these drawbacks or limitations. It is also intended to prevent the use and linking to the substrate of two or more separate layers of fusible material. Finally its aim is to enable such a thermally fusible product to be produced in the most advantageous way possible.

To this end, and according to an initial aspect, the invention proposes a thermally fusible product intended more specifically for the textile industry, of a type comprising on the one hand a woven, knitted or non-woven textile substrate, and, on the other hand, points of thermally fusible material distributed on one of the external surfaces of the substrate, more particularly polymer-based, characterised in that it contains at least one reactive material and one reactive means capable of stimulating, assuring, or promoting the reaction between the reactive material and one part of the thermally fusible material in order to partially modify its structure, at least on the interface with the substrate, while preventing the thermally fusible material from penetrating through the substrate under the influence of heat, pressure or steam.

According to a second aspect, the invention proposes a method of producing a thermally fusible product for the textile industry, of a type in which points of a thermally fusible material, more especially polymer-based, are distributed on one of the surfaces of a woven, knitted or non-women textile substrate, characterised in that at least one reactive material and at least one reactive means are linked with the thermally fusible material in order for a reaction to take place between the reactive material and the thermally fusible material, modifying the chemical structure of part of the thermally fusible material in contact with the textile substrate so as to prevent the thermally fusible material penetrating through the substrate when used.

The invention differs from the state of the art in that the unwanted thermally fusible properties of the thermally fusible material, which cause, for example, unwanted penetration of the substrate, are eliminated, or at least diminished by direct action on the thermally fusible material rather than by the addition of other, different, thermally fusible materials or by special, essentially physical, production methods.

The invention will be understood more clearly with the help of the following description.

A thermally fusible product according to the invention intended especially for the textile industry is, of a type comprising on the one hand a woven, knitted or non-woven textile substrate, and, on the other hand, points of a thermally fusible material distributed on one of the external surfaces of the substrate, which is specifically polymer-based and also chemical means which act on the thermally fusible material in order to modify its chemical structure, to a partial extent, at the substrate interface, so as to prevent the thermally fusible material penetrating through the substrate under the influence of heat and/or pressure.

The textile substrate itself is known to a man skilled in the art and does not constitute the subject matter of the invention. For this reason it is not described in more detail here.

The same applies to the general structure of the thermally fusible product which contains a thermally fusible material distributed in points on the substrate.

The essentially chemical means for modifying the chemical structure contain at least one reactive material as well as at least one reactive means capable of stimulating, assuring and promoting a reaction between the reactive material and the thermally fusible material.

The reactive material can belong to different categories more especially to the category of thermosetting aminoaldehydes, particularly urea formol and melamine formol; the category containing simple molecules or polymers with at least one isocyanate function blocked or not; the category containing simple molecules of polymers with at least one aziridine function; the category of modified polymers which have at least one chemically reactive function. In the latter case, the reactive function is more especially an epoxy or vinyl function.

The reactive means is the application of heat and/or UV radiation and/or electron bombardment, or any equivalent means.

The reactive means can be used in the presence of catalysts; an acid catalyst and/or ammonium salt and/or magnesium salt (aminoplast thermosetting product); acid or alkaline catalyst (isocyanate function); base catalyst (aziridine function).

The reactive means of the reticulation of polymer modified by reactive epoxy function is contact with ternary amino and/or polyamine and/or anhydride molecules.

The reactive means of the reticulation reaction of the thermally fusible polymer and the polymer modified by reactive vinyl function is contact with photoinitiator products in the presence of UV radiation.

In the latter case, it is preferable for at least one photoinhibiting agent to be linked to the reactive means in order to limit the reticulation reaction.

The thermally fusible product can also comprise a thersometting polymer.

Preferably, the thermally fusible material is a polymer belonging to the category of copolyamides, copolyesters, polyethylenes, copolymers of polyethylene, polyurethanes and polyvinyl chlorides.

The thermally fusible material with a modified structure after the action of the reactive material and the reactive means, is either a thermoplastic polymer with chemical physical properties such as flow and viscocity at fusion temperature, which are different from those of the unmodified thermally fusible material, or a non-fusible thermosetting polymer.

The invention will be understood with the aid of several examples which are explanatory only and not limiting, of the particular case of a thermally fusible material constituted by copolyamides. These copolyamides (6, 6.6, 11, 12, etc.) can be represented in the following manner:

H$_2$N—[PA]—COOH

Structure PA being an aliphatic or aromatic chain of n simple structures which may be between several hundred and several thousands.

The two important reactive sites: the carboxyl COOH site and the NH primary amino site, can react chemically with the reactive materials in order to form modified products which can be represented as follows:

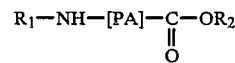

$$R_1-NH-[PA]-\underset{\underset{O}{\|}}{C}-OR_2$$

where R1 and R2 are mono groups: which are di or trifunctional, saturated and unsaturated, aliphatic or aromatic, and/or contain heteroatoms or not.

EXAMPLE 1

Methylol urea of general formula $$HO-CH_2-NH-\underset{\underset{O}{\|}}{C}-NH-CH_2-OH$$

reacting with the acid function of the thermally fusible polyamide in order to produce a new disfunctional polymer of type:

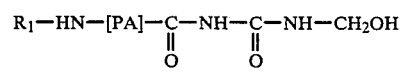

$$R_1-HN-[PA]-\underset{\underset{O}{\|}}{C}-NH-\underset{\underset{O}{\|}}{C}-NH-CH_2OH$$

having another two reactive functions (—NH et/ou —OH)

EXAMPLE 2

Melamine of general formula

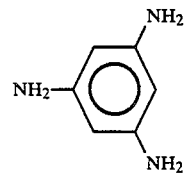

reacting with 1, 2 or 3 macromolecules of thermally fusible polyamide in order to produce new mono, di or tri dimensional polymers of type:

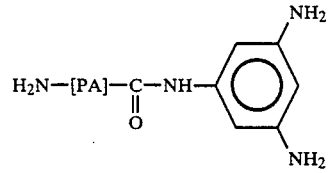

EXAMPLE 3

Isocyanates and polyisocyanates of general formula R—N=C=O where R can have one or more isocyanate structures reacting with the thermally fusible polyamide in order to product mono, di or tridimensional polymers of type:

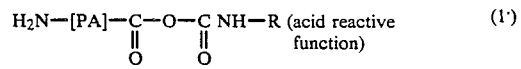

H$_2$N—[PA]—C—O—C NH—R (acid reactive function)     (1')

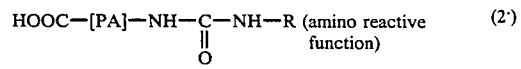

HOOC—[PA]—NH—C—NH—R (amino reactive function)     (2')

EXAMPLE 4

Aziridine and polyaziridine of general formula

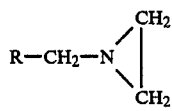

where R can have one or more aziridine structures reacting with the acid function of the thermally fusible polyamide in order to produce mono, di or tridimentional polymers of type:

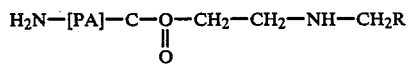

As a variation, in place of polyamide as thermally fusible material, modified polyamides with reactive sites can be used.

The preferred composition of the reactive material is thus as follows:
20% polyfunctional aziridine
10% acrylic thickening
0.5% ammoniac at 10 %
69.5% water with a pH value between 7 and 9

EXAMPLE 5

Vinyl group polyamides of general formula

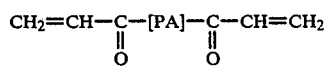

which in the presence of peroxides or photoinitiators can produce new polydimensional macromolecules.

EXAMPLE 6

Epoxy group polyamide of general formula

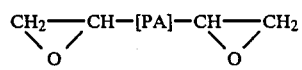

in which the reaction is comparable to that of epoxy resins facing amino, ternary, polyamino or anhydride reticulation agents.

The invention also relates to a method of producing a thermally fusible product for the textile industry, of a type in which points of a thermally fusible material, more especially polymer-based and in the form of powder or paste, are distributed on one of the surfaces of the woven, knitted, or non-woven textile substrate, characterized in that linked with the thermally fusible material are means of an essentially chemical and reactive nature, and at least one reactive means in order to provide a reaction between the reactive means and the thermally fusible material, modifying, at least partially, the chemical structure of the thermally fusible material.

According to a possible variation, the reaction causing the modification of the thermally fusible material is porduced after having distributed the points of thermally fusible material on the substrate.

For example, the reactive material is first of all added to the substrate followed by the thermally fusible material. Or, the thermally fusible material is first added to the substrate followed by the reactive material.

According to an improvement of the invention, a thermosetting polymer is added to the thermally fusible product after the modification reaction of the thermally fusible material.

According to a possible variation the thermally fusible material and the reactive material are added to the same surface ot the substrate.

According to another possible variation the thermally fusible material and the reactive material are added to the two opposite surfaces of the substrate.

Thus, according to one possible embodiment of the method, the reactive material is first added to the substrate, more particularly by padding or deposit through a suspension in foam, then the points of thermally fusible material are deposited on the substrate, more particularly by means of coating.

In another possible embodiment, the points of thermally fusible material are first deposited on the substrate, more particularly by means of coating, then the reactive material is added to the substrate, more particularly by means of vaporization or licking or contact.

Five embodiments of the method are desribed in more detail below.

In the first embodiment (full bath with chemical modification after coating) reactive materials soluble in water or a simple solvent (alcohol, chlorinated solvent, etc.) are used. The substrate is treated with the reactive material in the presence of a reaction catalyst before the points of thermally fusible material are deposited by any means, particularly padding or draining. The points of thermally fusible material are then added.

The reaction modifying the chemical structure of the thermally fusible material is initiated by an appropriate reactive means such as heating. The nature and extent of this reactive means are determined by simple operations carried out by the man skilled in the art with regard to the following requirements: to permit the reaction to begin, to prevent the autoreticulation of the reactive material, to prevent degradation of the thermally fusible material and the substrate.

In a second embodiment (vaporization) a mist of a solution of the reactive material is sprayed or atomized onto the surface of the substrate opposite to the one on which the points of thermally fusible material have already been deposited. This type of embodiment has advantages in limiting the amount of reactive material deposited on the substrate and directing the reactive material towards the thermally fusible material through the holes or perforations in the substrate.

In a third embodiment the thermally fusible material and the reactive material are closely mixed and then deposited in a mixed form on one of the surfaces of the substrate. The chemical modification reaction is produced by a reactive means such as thermal treatment or electron bombardment or UV.

In the variation in which the reactive means is thermal treatment, the substrate coated with the mixture of thermally fusible material and the reactive means passes over a cylinder heated to a temperature of 110 C. to 180 C. and for a period long enough to allow for the reaction to be initiated, but not reticulation of the reactive material or the degradation of the thermally fusible material or the substrate.

In the variation with electron bombardment, a photoinitiating agent is added to the mixture of thermally fusible material and reactive material to limit the propagation of the chemical modification reaction. Applying the method consists in passing the substrate coated in the mixture in front of a photon or electron source located on the non-coated side of the substrate, so that the particles bombard, preferably, the areas that are intended to be bombarded, i.e. the holes or perforations of the substrate facing the thermally fusible material. The duration of bombardment is determined by simple operations carried out by the man skilled in the art depending on the power of the radiation source, the nature of the substrate and the ratios of thermally fusible material (reactive material) photoinitiator agent.

In a fourth embodiment the substrate is padded with the thermally fusible product to which is mixed the reactive material. Then, the reactive means are sent to work to bring about the modification reaction, more particularly as described for the third embodiment, as far as full reticulation of the coated thermally fusible material. Then, a second coating is applied to the first coating with the thermally fusible material unmodified. The embodiment differs from the known coating technique for two totally different thermally fusible materieals. It has the advantage of facilitating the use of the thermally fusible product in the clothing industry.

In a fifth embodiment a coating of the thermally fusible material forming points is applied on a non-stick, mat for example siliconated or perfluorinated. This application is made with a rotating device.

The thermally fusible material initially dispersed in the aqueous phase or dissolved in a solvent is then dried. Drying is carried out by passing the silicon mat through an oven at a temperature of approximately 160 C. This evaporates the water or solvent and allows a homogeneity at the point of fusion of the thermally fusible polymer to be obtained.

On being taken out of the oven a controlled quantity of reactive material is deposited on the surface of the thermally fusible points by means of a cylinder.

The textile substrate is then applied to the upper surface of the points and the ensemble is passed under a calender in order to transfer the points onto the textile substrate.

The textile substrate is thus coated with thermally fusible points with an interspersed layer of reactive material.

It passes into an oven at a temperature of between 110 and 130 C. in order to produce a partial reaction between the reactive material and the thermally fusible polymer.

Other embodiments can also be envisaged: depositing the reactive material in the form of foam on one or the other surfaces of the substrate before or after coating with the thermally fusible material; licking with a smooth or perforated cylinder before depositing the reactive material on one or the other of the substrate surfaces; licking with a cylinder covered or not covered with silicon rubber coated with the reactive material; carding of one or the other surfaces of the substrate by threads of silk impregnated with the reactive material; depositing drops of a solution of the reactive material at the base and on the surface opposite that on which the material has been deposited.

I claim:

1. A thermally-fusible product intended particularly for the textile industry, comprising:
   a textile substrate having a pair of opposed external faces;
   points of a thermally-fusible polymer distributed on one of said external faces of said substrate to form an interface therewith; and
   chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material selected from the group consisting of thermodurcissable aminoaldehyde products, urea formols and melamine formols, said at least one reactive material reacting with said thermally-fusible polymer in the presence of a reactive means for stimulating, assuring, or promoting the reaction between said reactive material and at least part of said thermally-fusible polymer and in the presence of a mixture comprising at least one of an acid catalyst, an ammonium salt, and a magnesium salt.

2. A thermally-fusible product intended particularly for the textile industry, comprising:
   a textile substrate having a pair of opposed external faces;
   points of a thermally-fusible polymer distributed on one of said external faces of said substrate to form an interface therewith; and
   chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material selected from the group consisting of simple molecules or polymers with at least one isocyanate function blocked or not, said at least one reactive material reacting with said thermally-fusible polymer in the presence of a reactive means for stimulating, assuring, or promoting the reaction between said reactive material and at least part of said thermally-fusible polymer and in the presence of a catalyst selected from the group consisting of acid catalysts or alkaline catalysts.

3. A thermally-fusible product intended particularly for the textile industry, comprising:
   a substrate having a pair of opposed external faces;
   points of a thermally-fusible polymer distributed on one of said external faces of said substrate to form an interface therewith; and
   chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material selected from the group consisting of simple molecules or polymers with at least one aziridine function, said at least one reactive material reacting with said thermally-fusible polymer in the presence of a reactive means for stimulating, assuring, or promoting the reaction between said reactive material and at least part of said thermally-fusible polymer and in the presence of a base catalyst.

4. A thermally-fusible product intended particularly for the textile industry, comprising:
   a substrate having a pair of opposed external faces;
   points of a thermally-fusible polymer distributed on one of said external faces of said substrate to form an interface therewith; and chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material selected from the group consisting of polymers modified by at least one reactive chemical function, said at least one reactive material reacting with said thermally-fusible polymer in the presence of a reactive means for stimulating, assuring, or promoting the reaction between said reactive material and at least part of said thermally-fusible polymer.

5. The product of claim 4, wherein said at least one reactive material selected from the group consisting of polymers modified by at least one reactive chemical function is a polymer modified by a reactive epoxy function and said reactive means comprises at least one ternary amine, polyamine or anhydride, whereby the reticulation of said polymer modified by reactive epoxy function is brought about by contact with said ternary amine, polyamine or anhydride.

6. The product of claim 4, wherein said at least one reactive material selected from the group consisting of polymers modified by at least one reactive chemical function is a polymer modified by a reactive vinyl function, and said reactive means comprises a peroxide, whereby the reticulation of said polymer modified by a reactive vinyl function is brought about by contact with said peroxide in the presence of heat.

7. The product of claim 4, wherein said at least one reactive material selected from the group consisting of polymers modified by at least one reactive chemical function is a polymer modified by a reactive vinyl function and said reactive means comprises at least one photoinitiator capable of reacting with UV radiation, whereby the reticulation reaction of said polymer modified by a reactive vinyl function is brought about by contact with said at least one photoinitiator in the presence of UV radiation.

8. The product of claim 7, further comprising at least one photoinhibitor agent linked to said reactive means, whereby said reticulation reaction is limited.

9. The product of claim 8, further comprising a thermosetting polymer.

10. A thermally-fusible product intended particularly for the textile industry, comprising:
a textile substrate having a pair of opposed external faces;
points of a thermally-fusible polymer distributed on one of said external faces of said substrate to form an interface therewith; and
chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material sensitive to radiation, said at least one reactive material reacting with said thermally-fusible polymer in the presence of a reactive means for stimulating, assuring, or promoting the reaction between said reactive material and at least part of said thermally-fusible polymer.

11. A thermally-fusible product intended particularly for the textile industry, comprising:
a textile substrate having a pair of opposed external faces;
points of a thermally-fusible polymer distributed on one of said external faces of said substrate to form an interface therewith; and
chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material selected from the group consisting of copolyamide, copolyester, polyethylene, polyethylene copolymers, polyurethane, and polyvinyl chloride, said at least one reactive material reacting with said thermally-fusible polymer in the presence of a reactive means for stimulating, assuring, or promoting the reaction between said reactive material and at least part of said thermally-fusible polymer.

12. A thermally-fusible product intended particularly for the textile industry, comprising:
a textile substrate having a pair of opposed external faces;
points of a thermally-fusible polymer distributed on one of said external faces of said substrate to form an interface therewith; and
chemical means for acting on said thermally-fusible polymer in order to partially modify the chemical structure of said thermally-fusible polymer at least at said interface so as to prevent said thermally-fusible polymer from flowing through said substrate under the influence of heat, pressure, or steam, said chemical means comprising at least one reactive material and said thermally-fusible polymer with a partially modified chemical structure being selected from the group consisting of a thermoplastic polymer with physico-chemical properties of plastic flow, viscosity, and melting point which differ from that of said thermally-fusible polymer with an unmodified chemical structure, or a thermoduric non-fusible polymer, said at least one reactive material reacting with said thermally-fusible polymer in the presence of a reactive means for stimulating, assuring, or promoting the reaction between said reactive material and at least part of said thermally-fusible polymer.

13. A thermally-fusible product intended particularly for the textile industry comprising:
a textile substrate having a pair of opposed external faces;
points of thermally-fusible polymer distributed on one of said external faces of said substrate to form an interface therewith;
a chemically reactive material capable of chemically altering said thermally-fusible polymer at least in part, whereby said thermally-fusible polymer is prevented from flowing through said substrate under the influence of heat, pressure, or steam; and
chemical reactive means for promoting a reaction between said chemically reactive material and said thermally-fusible polymer, whereby said thermally-fusible polymer is chemically altered, at least at said interface, so as to prevent said thermally-fusible polymer from flowing through said substrate under the influence of heat, pressure, or steam.

14. The product of claim 13, wherein said reactive material includes at least one of thermo-setting aminoaldehyde, urea formol, melamine formol, polymers with at least one isocyanate function polymers with at least one aziridine function, modified polymers containing at least one chemically reactive functional group, polymers which contain an epoxy functional group, and polymers which contain a vinyl functional group.

15. The product of claim 14, wherein:
said reactive material is a polymer with an epoxy functional group; and
said reactive means includes at least one of ternary amino, polyamine, and anhydride, whereby when said epoxy functional group is brought into contact with said reactive means, the chemical structure of said thermally-fusible polymer is modified, at least at the substrate interface, so as to prevent said thermally-fusible polymer from flowing through said substrate under the influence of heat, pressure, or steam.

16. The product of claim 14, wherein:
said reactive material is a polymer with a vinyl functional group, and
said reactive means comprise photoinitiator products, whereby when said polymer containing a vinyl functional group is brought into contact with said photoinitiator products, and subjected to UV radiation, said photoinitiator products will promote the modification of the chemical structure of said thermally-fusible material, at least at the substrate interface, so as to prevent the thermally-fusible material from flowing through said substrate under the influence of heat, pressure, or steam.

17. The product of claim 14, wherein said reactive means is used in the presence of at least one of the following catalysts: an acid catalyst; ammonium salt; aminoplast thermosetting product; acid catalyst; alkaline catalysts; isocyanate function; base catalyst; aziridine function.

18. A process for the production of a thermally-fusible product intended particularly for the textile industry, comprising the steps of:
(a) providing a textile substrate having a pair of opposed external faces;
(b) distributing points of a thermally-fusible polymer-based material on at least one of the external faces of the textile substrate;
(c) linking a reactive material to the thermallyfusible material; and
(d) reacting the reactive material with the thermallyfusible material in order to modify the chemical structure of the thermally-fusible material, at least at the substrate interface, so as to prevent the thermally-fusible material from penetrating through the substrate under the influence of heat, pressure, or steam.

19. The process of claim 18, further comprising the step of:
(e) after said reacting step (d), linking the modified thermally-fusible material to a thermosetting polymer.

20. The process of claim 18, further comprising the step of adding the reactive material to the substrate by padding or deposit through a suspension in foam prior to said distributing step (b).

21. The process of claim 18, said distributing step (b) comprising depositing the thermally-fusible material on the substrate by coating and said linking step (c) comprising vaporizing the reactive material by licking or contact following said distributing step (b).

22. A process for the production of a thermally-fusible product intended particularly for the textile industry, comprising the steps of:
(a) providing a textile substrate having a pair of opposed external faces;
(b) coating a nonstick mat with points of a thermallyfusible polymer-based material with the assistance of a rotating frame;
(c) putting the mat with the points of thermallyfusible material in an oven at approximately 160 degrees C. so as to dry the thermally-fusible material;
(d) depositing a controlled quantity of reactive material on the points of thermally-fusible material with a licking cylinder;
(e) applying the textile substrate on the upper surface of the points;
(f) placing the nonstick mat with the points of thermally-fusible material and the applied textile substrate under a calendar in order to transfer the points onto the substrate; and
(g) placing the substrate with the transferred points in an oven at a temperature of between approximately 110 and 132 degrees C. to allow partial reaction of the thermally-fusible material with the reactive material, in order to modify the chemical structure of the thermally-fusible material, at least at the substrate interface, so as to prevent the thermally-fusible material from penetrating through the substrate under the influence of heat, pressure, or steam.

23. A process for the production of a thermally-fusible product intended particularly for the textile industry, comprising the steps of:
(a) combining a reactive material with a thermallyfusible polymer;
(b) distributing the thermally fusible polymer on at least one of the external faces of a textile substrate;
(c) reacting the reactive material with the thermally-fusible polymer material in order to modify the chemical structure of the thermally-fusible polymer material, at least at the substrate interface, so as to prevent the thermally-fusible material from flowing through the substrate under the influence of heat, pressure, or steam.

24. The process of claim 23, wherein step (c) is performed by subjecting the mixture of the thermally-fusible product and the reactive material to at least one of the following: heat, UV radiation, and electron bombardment.

* * * * *